K. K. JENSEN.
PORTABLE BATH SHOWER.
APPLICATION FILED MAR. 30, 1917.
1,336,034.
Patented Apr. 6, 1920.
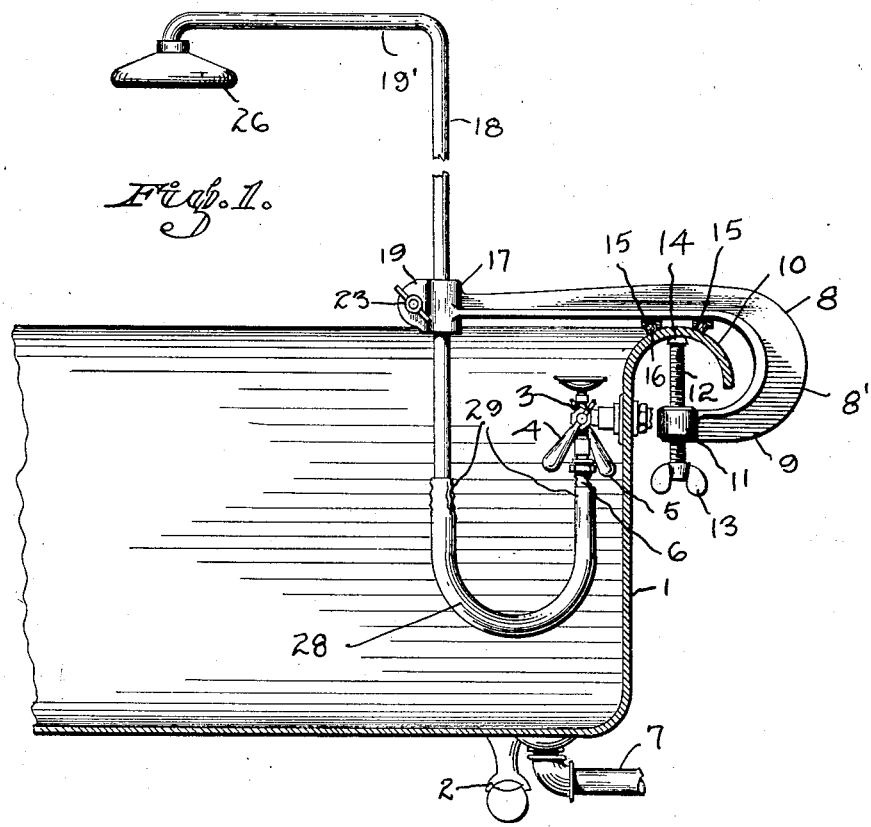
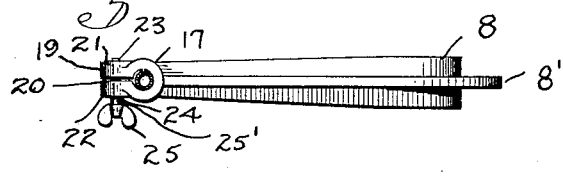
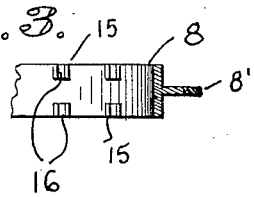
INVENTOR.
Karl K Jensen
BY
Baldwin Vale
ATTORNEY.

UNITED STATES PATENT OFFICE.

KARL K. JENSEN, OF BERKELEY, CALIFORNIA.

PORTABLE BATH-SHOWER.

1,336,034.  Specification of Letters Patent.  Patented Apr. 6, 1920.

Application filed March 30, 1917. Serial No. 158,558.

*To all whom it may concern:*

Be it known that I, KARL K. JENSEN, a citizen of Denmark, and a resident of the city of Berkeley, county of Alameda, and State of California, have made new and useful Improvements in Portable Bath-Showers, of which the following is a description.

The object of this invention is to provide a portable shower, cheap in construction, and adapted to be quickly and easily secured and adjusted.

In the drawing:

Figure 1 is a partial section of a bath tub showing the device applied.

Fig. 2 is a plan view of the fastening bracket showing the clamping screw.

Fig. 3 is a plan view of the bottom face of the fastening bracket showing the manner of securing the gaskets thereto.

The construction illustrated in the drawings shows the conventional type of bath tub, generally designated by the numeral 1, supported by feet 2, and having the cold and hot water inlets connected with the mixing faucet 3. The handles 4 and 5 regulate the amount of flow and the temperature of the water issuing from the nozzle 6. The outlet pipe is shown at 7.

The device proper consists of the arm 8, T-shaped in cross section, having the ends thereof bored to receive the shower pipe in one end and fastening bolt in the opposite end. The fastening arm is J or hook-shaped, having the section 9 formed thereon to extend around the curved portion 10 of the bath tub. The lug 11 is formed on the extremity of the curved end and as before mentioned has the set screw 12 therein. This bolt 12 is of the usual form, and as shown in the drawings, has the butterfly handle 13 thereon to aid in tightening or loosening, and on its opposite end has the swivel button 14. The button 14 adjusts itself to the inner curved edge of the bath tub and fixes the bracket in place.

On the under side of the fastening bracket opposite the lug 11 is positioned, on each side of the bolt, a pair of blocks 15 drilled out to receive the buttons 16 which may be of rubber or of any flexible material. The gaskets are fastened onto the lower part of the bracket that extends inward over the tub. This arm is webbed as indicated at 8' to provide additional strength for strains that are imposed upon it.

The lug 17 on the bracket as shown in Fig. 2 is circular in shape and has the extension 19 thereon. The hole bored through the center of the lug 17 is of little less diameter than the shower pipe extending therethrough while the lug 19 is divided centrally, as indicated at 20, into sections 21 and 22, clear through to the hole 20 that is formed therein. Both portions 21 and 22 of the lug have the hole 23 therein to receive the bolt 24 with the handle 25 thereon. The side 21 is threaded and the shoulder 25' provides a means for forcing the two sections together and clamping the pipe 18 in the hole 20. The shower pipe 18 is of greater diameter than the hole 20 and when the bolt 23 is turned so as to clamp the faces 21 and 22, a tightening action will be exerted on the pipe 18. Therefore, it can be readily seen that this fastening arrangement provides a means whereby the shower pipe 18 can be lowered vertically or swiveled laterally.

The pipe 18 is bent at right angles as indicated at 19' and terminates in the shower head 26. This head 26 is of the conventional type of spray used in shower baths. The opposite end of the pipe 18 has the flexible connection 28 thereon extending to the nozzle fixed to the faucet 3. As indicated at 29, the ends of the pipe 18 and of the nozzle can be corrugated to frictionally hold the tubing thereon.

In Fig. 3 the rubber buttons are positioned in pairs on opposite sides of the fastening arm. In Fig. 1 they are shown spaced far enough apart to bear on opposite sides of the center of the tub edge when the bracket 8 is fixed in position. The manner of clamping the bracket to the tub top forms a very rigid structure in that the clamping gaskets are pressed against the top tub edge by an opposed force on the under side placed between the buttons to fix the bracket rigidly in position.

Having thus described my invention, what I claim and desire to secure by Letters Patent is:

In a device of the character described a bracket adapted to be supported on the edge of a tub; spaced gaskets on the under side of the bracket, contacting with the tub edge; an extension elbow on said bracket extending under the tub edge; a threaded clamp adjustably mounted in said elbow and adapted to be moved into frictional contact with the tub edge; a clamp formed in the opposite end of said bracket; a shower tube adapted to be secured therein; a shower head on one end of said shower tube; means for regulating the vertical and lateral position of said shower head by adjustment of the shower tube and a flexible tube connecting the shower tube to the source of water supply.

In testimony whereof I have hereunto set my hand at San Francisco, California, this 8th day of March, 1917.

KARL K. JENSEN.

In presence of—
 BALDWIN VALE,
 A. J. HENRY.